Figure 1:
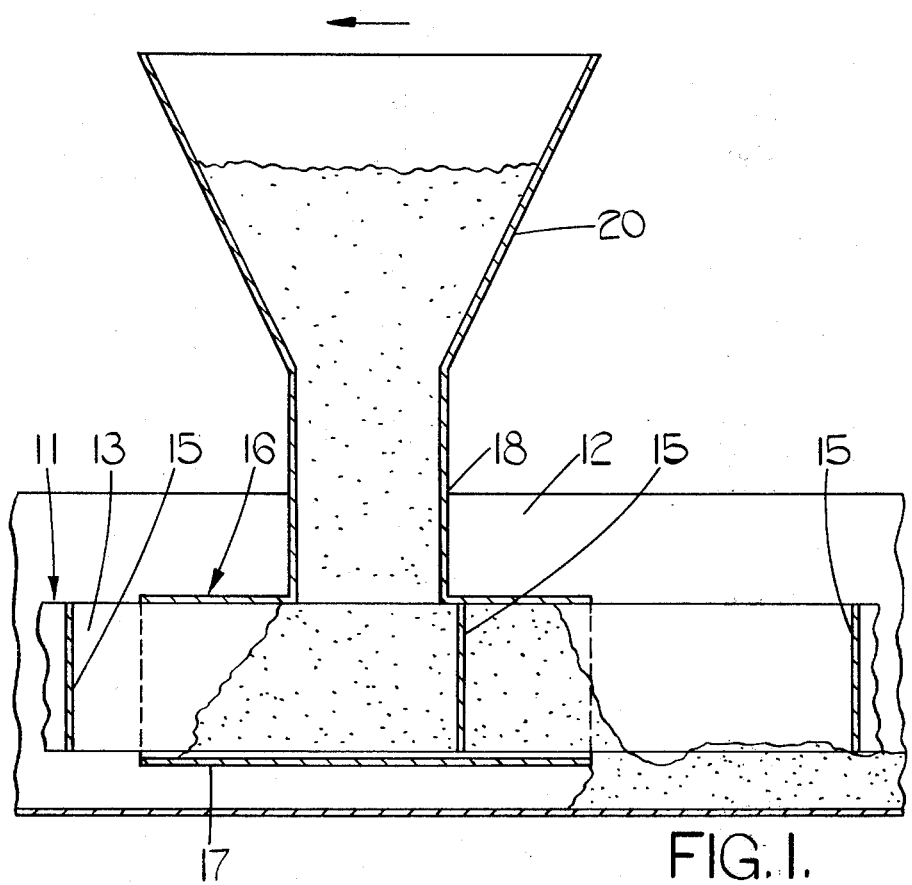

United States Patent [19]

Smith

[11] 3,985,105
[45] Oct. 12, 1976

[54] APPARATUS FOR DISPENSING ANIMAL FOODSTUFFS

[75] Inventor: John Francis Smith, Alcester, England

[73] Assignee: Arrow Vale Egg Producers Limited, England

[22] Filed: Mar. 5, 1975

[21] Appl. No.: 555,539

[30] Foreign Application Priority Data

| Mar. 29, 1974 | United Kingdom | 14189/74 |
| Aug. 29, 1974 | United Kingdom | 37740/74 |
| Oct. 23, 1974 | United Kingdom | 45941/74 |
| Dec. 7, 1974 | United Kingdom | 53035/74 |
| Jan. 2, 1975 | United Kingdom | 156/75 |
| Feb. 11, 1975 | United Kingdom | 5705/75 |
| Feb. 22, 1975 | United Kingdom | 7553/75 |

[52] U.S. Cl. .......................... 119/52 B; 119/52 A; 119/53
[51] Int. Cl.² .................. A01K 5/02; A01K 39/012
[58] Field of Search ............ 119/52 B, 51 FS, 51 R, 119/52 R, 52 A, 52 AF, 53, 56 R, 57, 58, 61, 63, 10, 18, 19

[56] References Cited
UNITED STATES PATENTS

| 1,100,927 | 6/1914 | Sutton | 119/61 |
| 2,536,621 | 1/1951 | Arnold | 119/19 |
| 2,786,447 | 3/1957 | Murray | 119/52 B |
| 2,797,663 | 7/1957 | Bailey | 119/52 B |
| 3,478,723 | 11/1969 | Berg | 119/52 B |
| 3,695,415 | 10/1972 | Bakker et al. | 119/52 B |

Primary Examiner—Russell R. Kinsey
Assistant Examiner—Peter K. Skiff
Attorney, Agent, or Firm—Holman & Stern

[57] ABSTRACT

Apparatus for dispensing animal foodstuffs particularly in granular, particulate, or like form. The apparatus is intended for use in conjunction with a conventional elongate feeding trough serving a plurality of feeding stations. The apparatus includes a foodstuffs receiver which is of elongate form, and which is equal in length to that length of the trough into which foodstuffs are to be dispensed. A dispensing head is arranged to be coupled to a foodstuffs supply, and is movable relative to the receiver along the length of the receiver. The head includes guides which guide the receiver through the head during relative movement between the two, and the head has a foodstuffs outlet whereby foodstuffs can pass from the supply through the head and into that portion of the receiver which is within the head at any given time. The volume of foodstuffs delivered into the receiver during relative movement of the head and receiver is determined by the dimensions of the receiver and the cooperation of the head and the receiver, and in this way the volume of foodstuffs carried by the receiver into the trough is accurately controlled.

22 Claims, 17 Drawing Figures

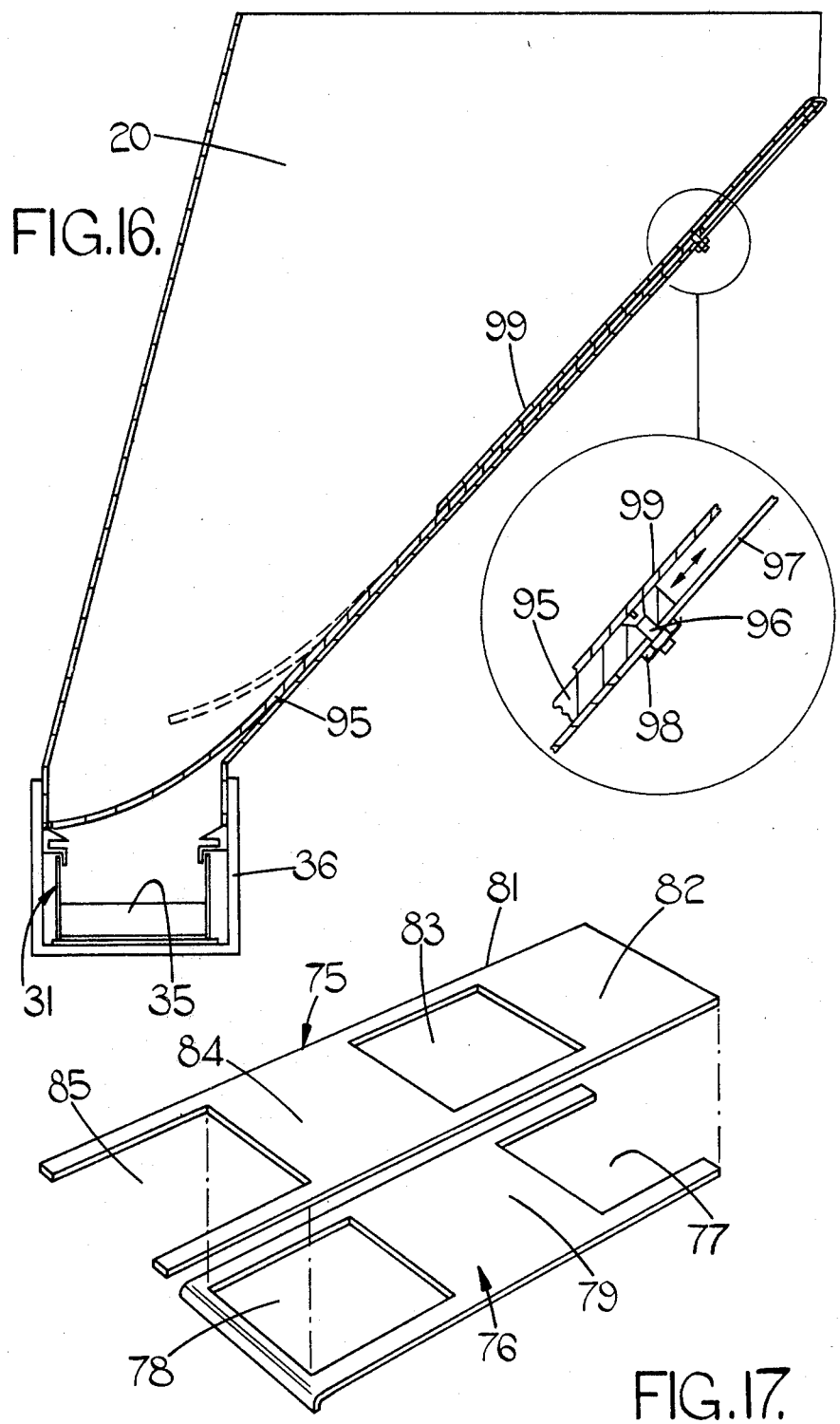

APPARATUS FOR DISPENSING ANIMAL FOODSTUFFS

This invention relates to apparatus for dispensing animal foodstuffs particularly in granular, particulate, or like form.

A known form of apparatus for dispensing animal foodstuffs, as applied to feeding chickens in a chicken battery, includes an elongate trough which extends along the front of one row of battery cages. A foodstuffs hopper containing a bulk supply of the foodstuffs in granular, particulate, or like form is mounted for movement along the length of the trough, and has a discharge nozzle at its lower end, the discharge nozzle being positioned adjacent the base of the trough. As the hopper traverses the length of the trough foodstuffs fall from the discharge nozzle into the trough and the volume of food discharged at any point along the length of the trough is determined by the spacing between the end of the nozzle and the base of the trough. One problem found with such apparatus is that the volume of foodstuffs dispensed cannot be controlled accurately over the length of the trough. As the volume of food within the hopper decreases then the weight of the hopper decreases and the hopper has a tendency to rise relative to the trough as the load is relieved from the hopper mountings. Thus the spacing between the open end of the nozzle and the base of the trough increases allowing a greater volume of foodstuffs to be dispensed. It will be apparent therefore that a greater volume of foodstuffs will be dispensed per unit length of the trough towards the end of the movement of the hopper, than at the commencement of the movement of the hopper. Moreover, since the trough is of considerable length it is extremely difficult to ensure that the base of the trough is linear, and so throughout the length of the trough there will tend to be variations in the spacing between the base of the trough and the open end of the nozzle which will result in different volumes of foodstuffs being dispensed to different regions of the trough.

It is an object of the present invention to provide apparatus for dispensing animal foodstuffs wherein the above mentioned disadvantages are minimised.

Apparatus according to the invention is intended for use in conjunction with a conventional elongate feeding trough serving a plurality of feeding stations, the apparatus comprising, a foodstuffs receiver of elongate form equal in length to the length of trough into which foodstuffs are to be dispensed, and, a dispensing head arranged to be coupled to a foodstuffs supply and to be movable relative to the receiver and the trough along the length of the receiver, said head including guide means guiding the receiver through the head during relative movement therebetween, and said head having a foodstuffs outlet whereby foodstuffs can pass, in use, from said supply through the head and into that portion of the receiver within the head, the dimensions of the receiver, and the co-operation of the head and the receiver determining the volume of foodstuffs delivered into the receiver during relative movement of the head and the receiver, and so determining the volume of foodstuffs carried by the receiver into the trough along the length thereof.

Preferably the receiver includes a pair of spaced, parallel, elongate side walls interconnected at spaced points along their length by transverse partition walls. Preferably the partition walls are of a height less than the height of the side walls.

Desirably the partition walls are engaged with the side walls as a snap-fit.

Alternatively, said partition walls include portions at opposite ends thereof respectively, extending through the side walls respectively said portions being welded to the side walls.

Conveniently said portions are deformed on the exterior of the side walls to define heads resisting transverse dislocation of the side walls from the partition walls.

Conveniently there is provided a blanking member detachably engaged with the receiver, and serving, when in position along the length of the receiver to reduce the volume of the region of the receiver which receives the blanking member.

Preferably where the receiver includes partition walls of a height less than the height of the side walls then the end of the dispensing head which is the trailing end in use, includes a volume control member the position of which, relative to the receiver, is adjustable in directions towards and away from the partition walls, the volume control member being so shaped as to be able to extend between the side walls of the receiver, and the spacing of the volume control member from the partition walls determining the depth of foodstuffs in the receiver, and thus determining the volume of foodstuffs dispensed.

Preferably the receiver is open at top and bottom, and the head includes a base wall which closes the bottom of that portion of the receiver within the head at any given point in the movement of the head along the length of the receiver.

Desirably said base wall of the head is extended, at the trailing end of the head, beyond the volume control member.

Conveniently the volume control member is in the form of a flat plate of width substantially equal to the internal width of the receiver.

Alternatively, the volume control member is in the form of a plate having a region of width substantially equal to the width of the receiver, and inclined in the direction of the length of the receiver.

Desirably however the volume control member is in the form of a plate of V-shaped cross-section positioned with its apical edge extending generally vertically and at right angles to the direction of movement of the receiver, the apical edge being the trailing point of the volume control member.

Preferably the head includes a volume control member at each end thereof, so that the apparatus can be used to dispense foodstuffs during movement of the head relative to the receiver, along the length of the receiver, in either direction.

Desirably the head is provided with valve means for controlling the flow of foodstuffs through the head into the receiver.

Preferably associated with the outlet aperture of the head through which food flows the supply into the receiver the head carries first and second baffle means, the baffle means being spaced longitudinally of the receiver, the first and second baffle means extending transversely of the receiver in opposite directions towards the centre line of the receiver, the first baffle means masking one side region of the receiver from the supply of foodstuffs, and the second baffle means masking an opposite side region of the receiver from the supply of foodstuffs, whereby, as the head passes along the receiver each part of the receiver initially receives foodstuffs in that side region not masked by the baffle means, and thereafter receives foodstuffs only in that region not masked by the second baffle means.

Conveniently the head includes first and second outlet apertures by way of each of which foodstuffs can flow into the receiver, each of said outlet apertures having associated therewith first and second baffle means as specified in the preceding paragraph.

The invention further resides in apparatus as specified above, in combination with a hopper for containing foodstuffs, the hopper communicating with the outlet aperture of the head so that foodstuffs can flow from the hopper through the outlet aperture and into the receiver within the head.

Conveniently the hopper is divided internally into first and second compartments, and each compartment communicates with the interior of the head by way of a respective outlet aperture in the head.

Desirably each outlet aperture has associated therewith valve means for controlling flow of foodstuffs through the aperture.

Desirably the member dividing the hopper into first and second compartments carries an element which extends towards the receiver, and which abuts the partition walls of the receiver during relative movement of the head and receiver, the element being vibrated by abutment with the partition walls during such relative movement, and the vibration being transmitted by the element to the hopper dividing member so as to aid the flow of foodstuffs from the hopper compartments.

Figure 2:
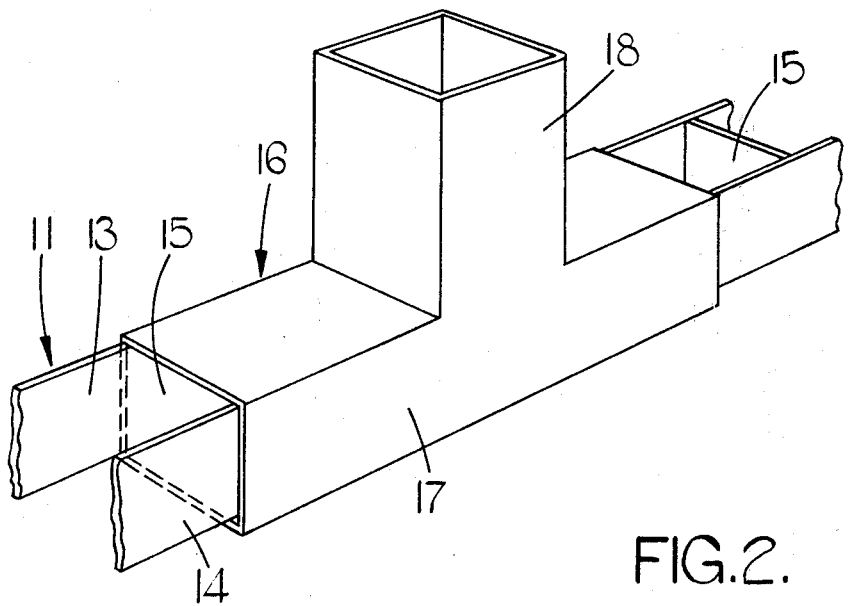
Figure 3:
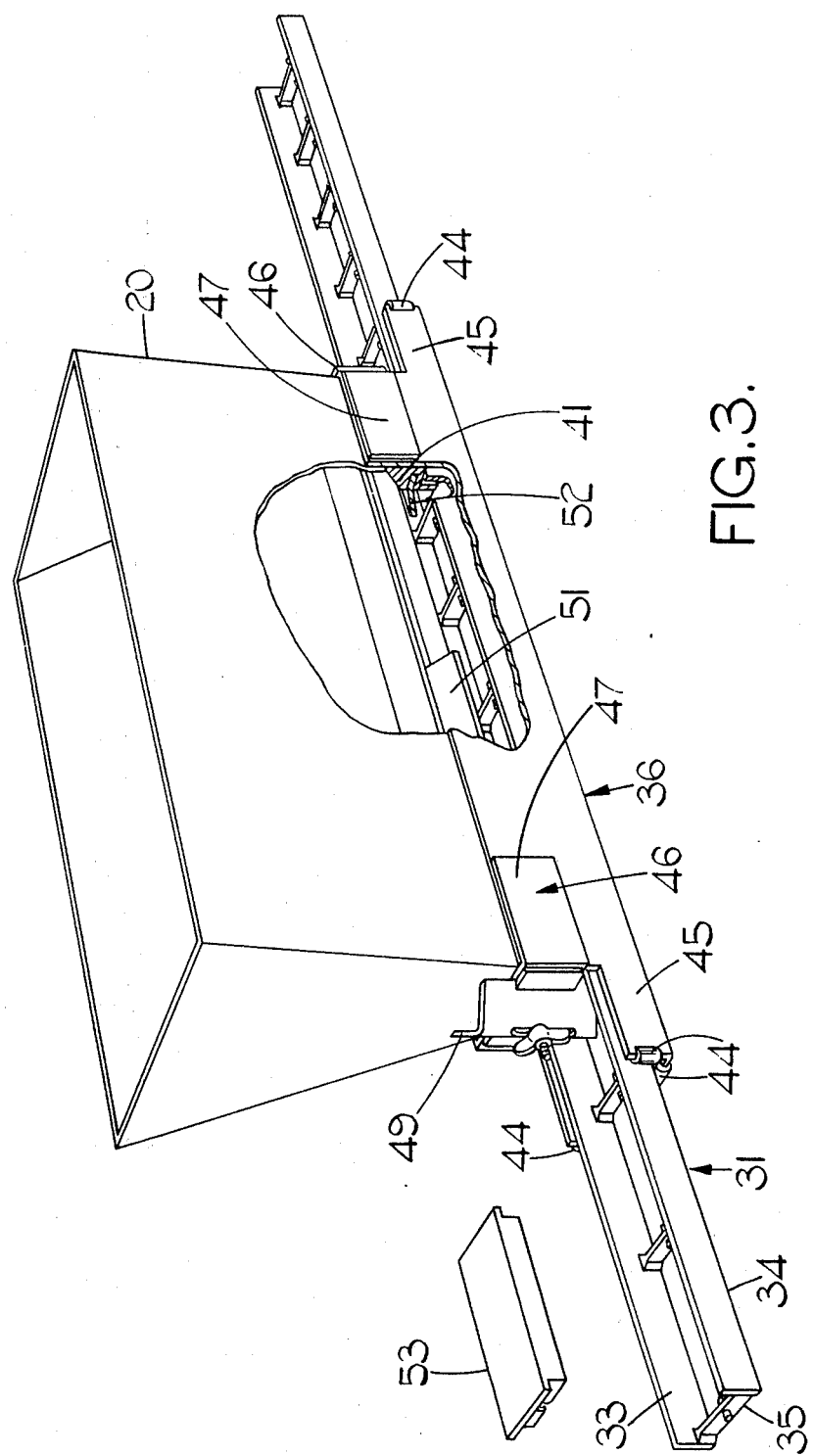
Figure 4:
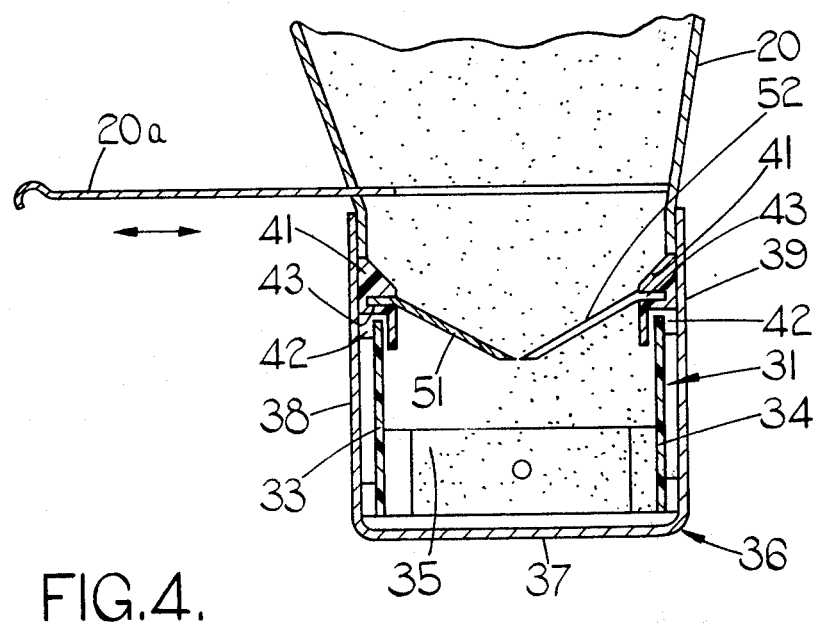
Figure 5:
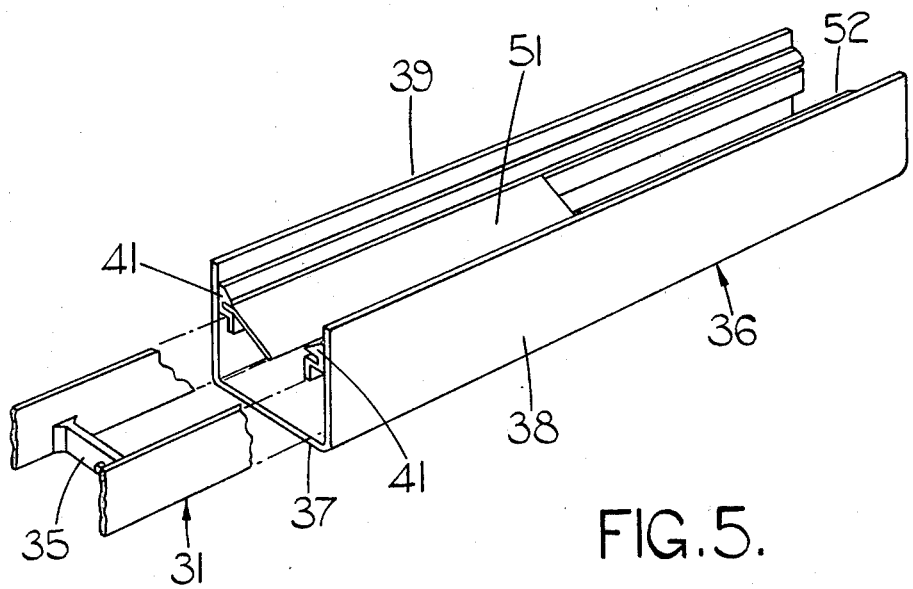
Figure 6:
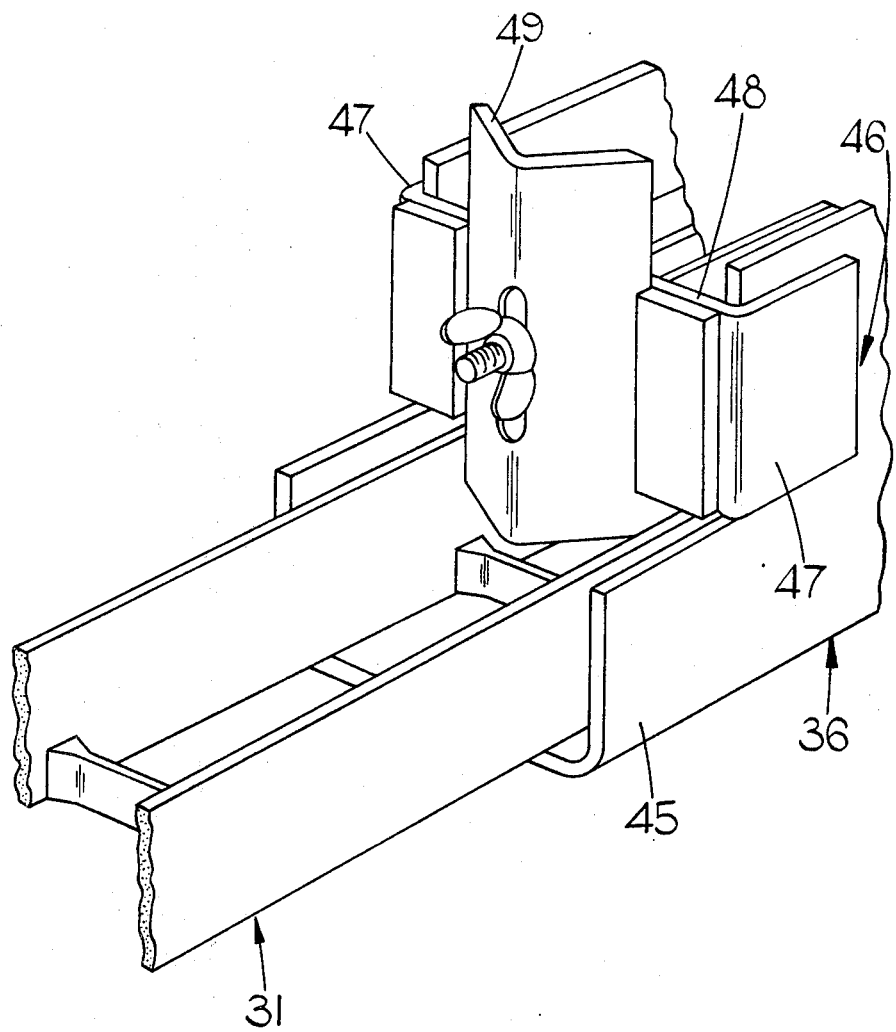
Figure 7:
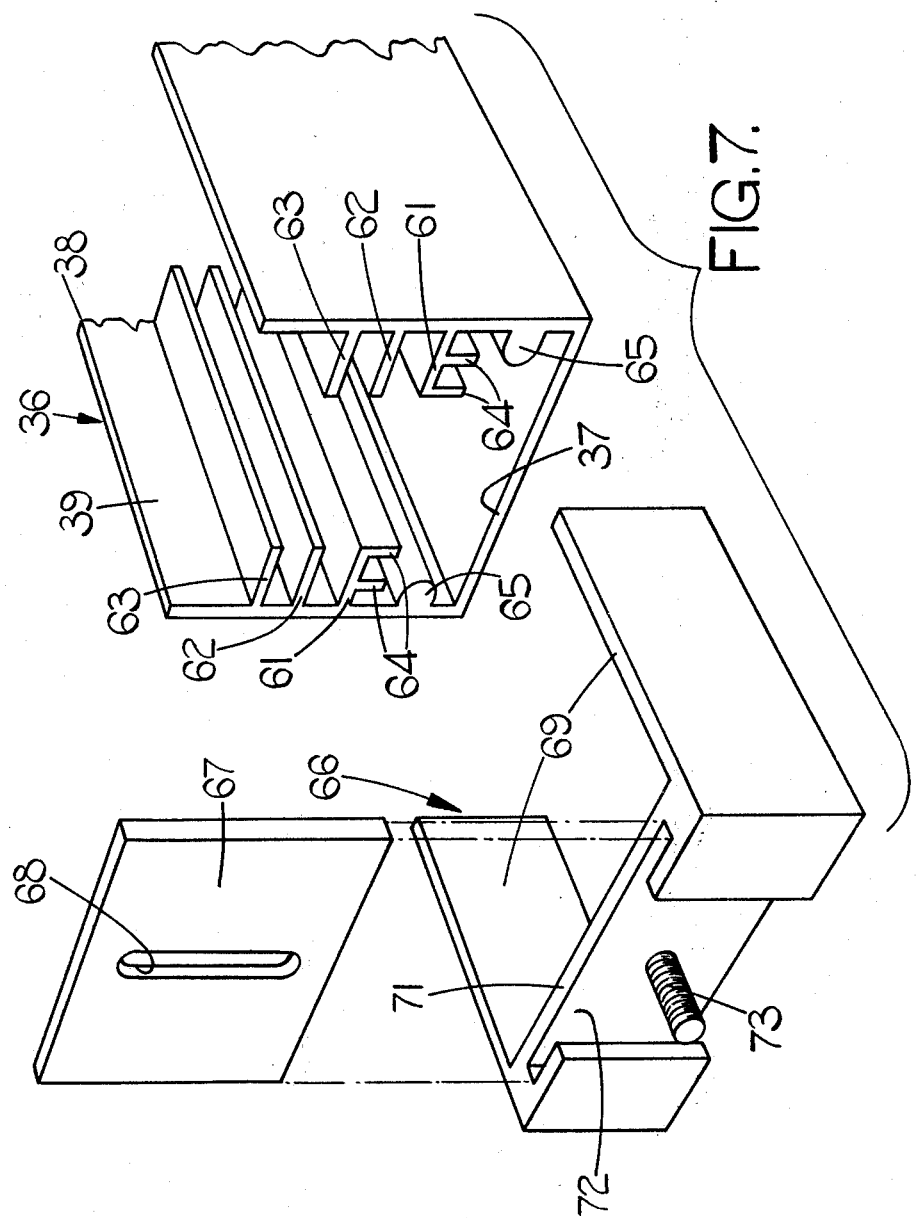
Figure 8:
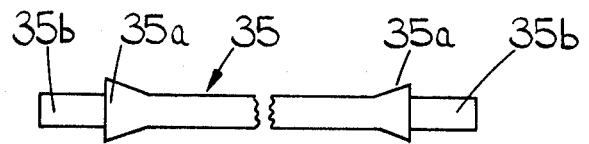
Figure 9:
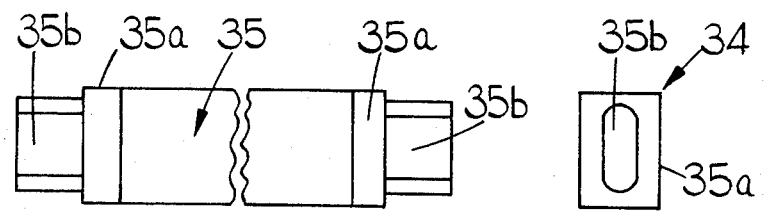
Figure 10:
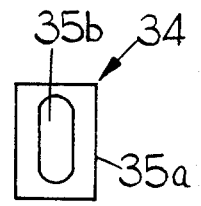
Figure 11:
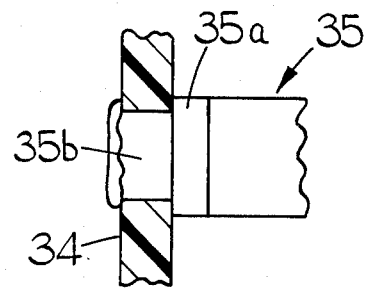
Figure 12:
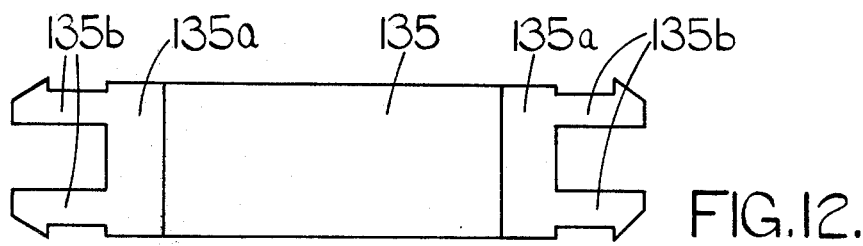
Figure 13:
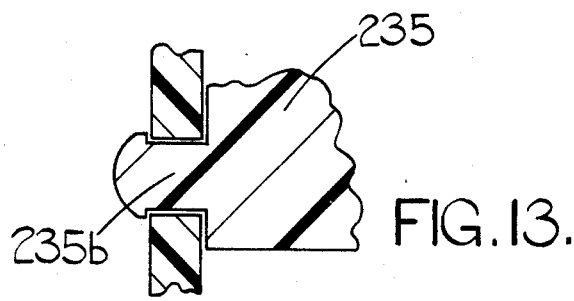
Figure 14:
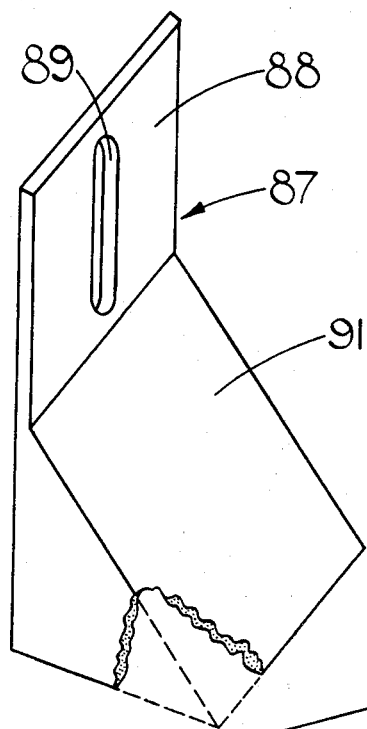
Figure 15:
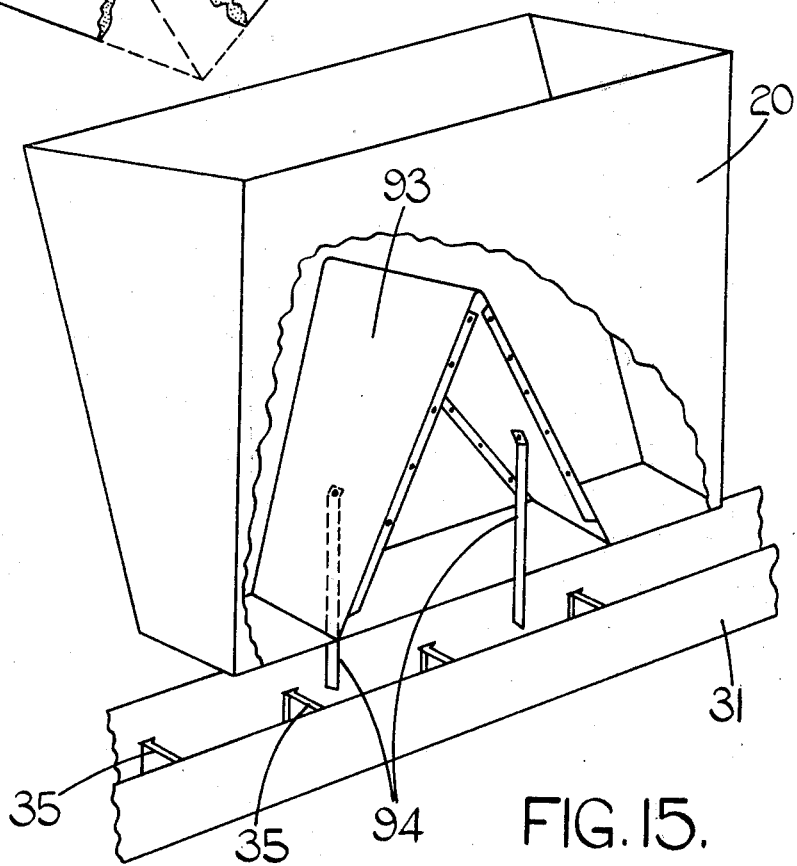

In the accompanying drawings,

FIG. 1 is a partly sectional diagrammatic representation of apparatus in accordance with one example of the invention, for dispensing foodstuffs, applied to the feeding arrangement of a chicken battery, FIG. 2 is a perspective view of part of the apparatus shown in FIG. 1, FIG. 3 is a diagrammatic perspective representation of apparatus in accordance with a second example of the invention, FIG. 4 is a transverse sectional view of part of the apparatus shown in FIG. 3 to an enlarged scale, FIG. 5 is a perspective view to an enlarged scale of part of the apparatus shown in FIG. 3, FIG. 6 is a view similar to FIG. 5 of a further part, and to a further enlarged scale, FIG. 7 is a diagrammatic perspective representation of a modification of part of the apparatus shown in FIGS. 3 to 6, FIGS. 8, 9 and 10 are plan, side elevational, and end elevational views respectively of a partition wall shown in FIGS. 3, 4, 5 and 6, FIG. 11 is a partly sectional diagrammatic representation of part of the partition wall of FIGS. 8 – 10 secured to a side wall, FIG. 12 is a view similar to FIG. 9 of a modified partition wall, FIG. 13 is a view similar to FIG. 11 of a further modification, FIG. 14 is a perspective view of a volume control member alternative to those shown in FIGS. 6 and 7, FIG. 15 is a diagrammatic perspective representation of part of a further modification of the apparatus shown in FIG. 3, FIG. 16 is a diagrammatic sectional view of a further modification of the apparatus, and FIG. 17 is an exploded perspective view of part of a valve structure for use in the apparatus.

Referring to the drawings, the apparatus shown is of a simplified, and basic form, and is shown as applied to the feeding arrangement of a chicken battery. The apparatus comprises an elongate foodstuffs receiver 11 which lies in the conventional, elongate feeding trough 12 associated with one row of battery cages. The receiver 11 is moulded in synthetic resin material and comprises a pair of elongate, parallel side walls 13, 14 interconnected at spaced points along their length by transverse, integral, partition walls 15. The receiver is open at top and bottom, the walls 15 serving primarily to interconnect the walls 13, 14 but also to divide the receiver into sections along its length.

The apparatus further includes a dispensing head 16 which in use is secured to the movable hopper 20 of a conventional foodstuffs dispensing apparatus. The hopper 20 is, as in the conventional arrangement, movable along the length of the trough 12. The hopper contains a bulk supply of the foodstuffs, and carries the head 16 at its lower end. The head 16, as the hopper 20 traverses the length of the trough, traverses the length of the receiver.

The head 16 is also moulded in synthetic resin material, and comprises a horizontal tube 17 of rectangular, transverse cross-section. The passage of the tube 17 is similar in shape and dimensions to the cross-section of the receiver 11, and so the receiver 11 can slide through the passage with minimal clearance. It will be appreciated that the portion of the receiver 11 at any time within the tube 17 is closed at top and bottom by the upper and lower surfaces of the tube 17 except in that region of the upper surface of the tube 17 defining an outlet orifice whereby foodstuffs can flow from the hopper into that portion of the receiver within the tube 17. The outlet orifice is defined intermediate the ends of the upper surface of the tube 17 by a vertically extending hollow portion 18 which at its free end communicates with the hopper 20. The lower end of the portion 18 communicates with the passage of the tube 17 and if desired the portion 18 or the outlet region of the hopper 20 can be provided with a movable flap to permit the flow of foodstuffs from the hopper to be controlled.

The receiver 11 extends along the length of the trough 12 into which food is to be dispensed. The volume of food dispensed by the apparatus is determined by the volume of the receiver, which, since the receiver is open top and bottom, is in part controlled by the dimensions of the head. As the hopper, together with the head 16, move along the length of the trough the receiver slides through the tube 17 and foodstuffs fall freely through the portion 18 into the receiver. The volume of foodstuffs per unit length of the receiver is thus accurately controlled. As the head progresses along the receiver 11 the filled receiver leaves the tube 17 and so is once again open at top and bottom. Thus the foodstuffs can flow from the receiver into the base of the feeding trough 12. However, it is to be appreciated that it is not essential for the foodstuffs to flow into the trough from the receiver, since the open top surface of the receiver is equally accessible to the battery chickens.

Since the head 16 moves relative to the receiver 11 it is not essential that the receiver 11 includes the transverse partition walls 15. However, the partition walls are desirable both to ensure that the foodstuffs moves with the receiver relative to the head, and since the receiver 11 extends over a considerable length, then without the partition walls it would be difficult to ensure that the side walls 13, 14 have sufficient rigidity to maintain their spacing accurately along the whole length of the receiver. Moreover, it is to be understood that if desired the receiver 11 could be provided with a base wall closing the bottom of the receiver. In such an arrangement foodstuffs would not flow from the receiver into the feeding trough, but would be retained in the feeding trough within the receiver. The use of such a receiver would remove the necessity to provide a bottom wall on the tube 17 although it would still of course be necessary to retain some form of guide means to ensure that the receiver passes through the dispensing head, and has its upper edges in close proximity to the upper surface of the tube 17.

The dimensions of the receiver 11 and head 15 can be chosen to suit a large number of different applications. Furthermore, where it is necessary to feed several different foodstuffs simultaneously or in sequence then a number of heads 16 with associated hopper can be mouted on the same carriage movable along the length of the common trough each head having associated therewith a particular receiver 11, and all of the receivers 11 lying in the common feeding trough.

It will be understood that the receiver 11 and the head 16 can be applied to the conventional foodstuffs dispensing arrangement with the minimum of inconvenience. The receiver 11 is positioned in the trough and is anchored against axial movement relative to the trough in any convenient manner. The discharge nozzle of the hopper 20 is removed and replaced by the head 16 through which has been threaded the receiver 11.

The remaining drawings show more practical, and advantageous forms of the apparatus than those shown in FIGS. 1 and 2. Referring to FIGS. 3 - 6 the apparatus once again includes an elongate receiver 31 which co-operates with a dispensing head 36 carried at the lower end of a hopper 20. The receiver 31 again extends along the length of the feeding trough (not shown) the receiver 31 being anchored at its opposite ends to the trough. The receiver 31 is similar to the receiver 11, but rather than being formed as an integral moulding, which of course is a relatively impractical and expensive arrangement for a long length of the receiver, the receiver 31 includes first and second side walls 33, 34 which are defined by separate lengths of a single, plane extruded strip, the side walls 33, 34 being spaced apart, and held in position relative to one another by transversely extending partition walls 35. The partition walls 35 are each moulded in a synthetic resin material, and are positioned adajcent the lower edges of the side walls 33, 34, the height of each partition wall 35 being somewhat less than the height of the side walls 33, 34.

The dispensing head 36 includes a one-piece channel shaped extrusion having a base 37 and a pair of parallel side walls 38, 39 upstanding from the base wall 37. Secured to the inner face of each side wall 38, 39 is an elongate moulding 41. The mouldings 41 are aligned with one another, and while for convenience the mouldings are formed separately from the channel shaped extrusion it is to be understood that if desired the extrusion could be produced with the mouldings 41 integral therewith. Each of the mouldings 41 includes a flange extending towards the base wall 37 and so defining with the respective side wall an inverted channel 42. Additionally, each moulding 41 includes a transversely directed longitudinally extending slot 43. Secured to the side and base walls of the head 36 are a plurality of moulded synthetic resin spacers 44 (FIG. 3) which engage and support the receiver 31 in such a manner that the points of contact between the receiver 31 and the head 36 are localized, and so friction between the receiver 31 and the head 36 is minimised. The upper free edges of the side walls 33, 34 of the receiver 31 engage within the channels 42 and the upper edges of the mouldings 41 are inclined downwardly and outwardly from the side walls so that foodstuffs falling through the head 36 are directed into the receiver, and cannot find their way between the outer surfaces of the side walls of the receiver and the inner surfaces of the side walls of the head 36.

The open free end of the hopper 20 extends into the receiver 36, and is secured to the side walls 38, 39 by any convenient means, for example by rivets. The outlet orifice of the head through which foodstuffs pass from the hopper into the receiver within the head is defined by the whole of the open lower periphery of the hopper 20.

At each end the head 36 includes an extension 45 projecting along the length of the receiver 31 beyond the end walls of the hopper 20. Secured to each longitudinal end of the head 36, inwardly from the free end of the extensions 45, is an end cap assembly 46. Each end cap assembly 46 includes a body portion having extending therefrom, and at right anlges thereto a pair of flanges 47 the respective longitudinal end of the head 36 being inserted between the flanges 47 and abutting the inner surface of the interconnecting wall 48 of the body portion 46. The flanges 47 are secured to the side walls 38, 39 of the head 36 in any convenient manner again, for example, by rivets. Adjustably mounted on each of the body portions 46 is a volume control member 49, the volume control member 49 each being of V-shaped transverse cross-section, the V-section member 49 being positioned with their apices vertical and spaced outwardly from the interconnecting walls 48 of the body portions 46. The free edges of the members 49 which engage their respective wall 48 are cut obliquely so as to make facial contact with the wall 48, and the wall 48 carries a pair of blocks which are undercut, and which partially overlie the inclined walls of their respective member 49. Thus each member 49 is movable vertically relative to the head 36 towards and away from the receiver 31. The width of each of the members 49 is substantially equal to the inner width of the receiver 31, and the vertical position of the members 49 relative to the receiver 31 is controlled by means of a captive bolt extending from the wall 48 of the respective body portion 46, the threaded shank of the bolt passing through an elongate slot in the respective member 49 and receiving a wing nut on the exterior of the respective member 49. Each wing nut bears against the apical edge of its respective member 49, and can be tightened to lock the respective member 49 in a chosen vertically adjusted position. It will be recognised that since the partition walls 35 of the receiver 31 have their upper edges lying below the level of the upper edges of the side walls of the receiver 31 then the members 49 can be adjusted to positions wherein their lowermost ends lie within the receiver 31. The range of adjustment which is provided has a lower limit where the lowermost ends of the members 49 clear the tops of the partition walls 35 by about a onesixteenth inch, and an upper limit position where the lower edge of each member 49 is substantially co-planar with the upper edges of the side walls 33, 34 of the receiver 31.

In use foodstuffs in granular, particulate, or like form flows from the bulk supply in the hopper 20 through the outlet orifice of the head, and into that portion of the receiver within the head. As the head traverses the length of the receiver the position of the member 49 at the trailing end of the apparatus determines the volume of foodstuffs dispensed. Thus if the trailing member 49 is adjusted to its lower limit position then the volume of foodstuffs dispensed will be the volume of that portion of the receiver bounded by the plane of the lower face of the receiver, the plane containing the top surfaces of the partition walls 35, and the side walls 33, 34. On the other hand, if the trailing member 49 is in its upper limit position then the volume dispensed will be the volume of the receiver. Clearly any intermediate position of the member 49 is possible. The extension 45 at the trailing end of the head 36 ensures that the foodstuffs dispensed cannot flow directly from the head beneath the volume control member 49 the extension 45 at the forward end of the head ensures that foodstuffs cannot spill forwardly through the receiver and into the trough 12, any foodstuffs spilling forwardly being caught by the forward extension 45 and thereafter being carried back into the head to form part of the accurately controlled, dispensed volume.

In the arrangement described where the foodstuffs can enter the receiver along the full length of the head then it is found that in some cases the receiver will be full by the time it has passed only part way through the head. Thus in such circumstances foodstuffs will only be taken from the forward end of the hopper and an uneven flow of foodstuffs from the hopper will occur. It is not practical to control the speed of movement of the head relative to the receiver in relation to the speed of flow of foodstuffs into the receiver, and thus in order to minimise the problem of uneven flow of foodstuffs from the hopper there is provided first and second baffle plates 51, 52 which extends from the mouldings 41 both inwardly, and downwardly towards the receiver. The baffle plates extend towards the centre line of the receiver, and the baffle plate 51 is spaced longitudinally of the head and the receiver from the baffle plate 52, the baffle plates 51, 52 together extending along the whole length of the outlet aperture through which foodstuffs flows from the hopper into the receiver. In the preferred arrangement each baffle plate thus masks half of the portion of the receiver beneath the outlet aperture at any given time. In the drawings the baffle plate 51 masks the left-hand half of the receiver while the baffle plate 52 masks the right-hand half. Thus as the head and the receiver move relative to one another, and assuming that the head is moving to the left in the arrangement shown in the drawings, then the baffle plate 51 will prevent foodstuffs being supplied to the left-hand side of the receiver in the first half of the length of the outlet aperture, and at the same time the baffle plate 52 will prevent supply of foodstuffs to the right-hand side of the receiver in the second half of the length of the outlet aperture. As the receiver moves relative to the aperture, and considering the receiver as a plurality of discreet lengths, then each length will initially be filled on its right-hand side by way of the first half of the length of the aperture, and then will be filled on its left-hand side by way of the second half of the length of the aperture. Thus there will be a substantially equal flow of foodstuffs through both halves of the lengths of the aperture simultaneously and the problem of uneven flow of foodstuffs from the hopper 20 will thereby be minimised. It will be understood that if desired, more than two baffle plates could be utilized, the baffle plates being spaced longitudinally of the head, and adjacent baffle plates being alternately on opposite sides of the head. The baffle plates 51, 52 are secured in position by having a longitudinal edge thereof inserted into the slot 43 of the appropriate moulding 41, the plates 51, 52 being secured to the mouldings 41 conveniently by means of an adhesive.

The reason for the provision of extensions 45 at both ends of the head has been discussed above. However, it will be noted that volume control members 49 are also provided at each end of the head even though only one volume control member 49 is operative at any given time. It will be recognised that the apparatus can be used to dispense food into the trough 12 by movement of the head along the receiver in either direction. Thus when the head is moving in one direction one of the members 49 will be the trailing, and therefore operative, member whereas during movement of the head in the opposite direction the other member 49 will be the trailing, and therefore operative, member.

Occasionally, in a chicken battery, a chicken must be removed from its cage either through death, or illness, and it may not be convenient to replace the chicken immediately. In order therefore that a reduced quantity of food is supplied to the trough 12 immediately in front of the cage from which the chicken has been removed there is provided a blanking plate 53 (FIG. 3). The blanking plate 53 is so dimensioned as to fit within the receiver 31 between a pair of adjacent partition walls 35. The blanking plate 53 can be arranged to be a snap-fit with lugs provided on the partition walls, and serves to reduce the volume of the appropriate region of the receiver 31 so that a reduced quantity of foodstuffs is dispensed in the blank region of the receiver. Where there is a single bird per cage then the blanking plate may be arranged to present totally the supply of foodstuffs in the region of the trough in front of an empty cage. However, more usually two or more birds are provided in each cage and thus in such an arrangement the blanking plate will ensure that an appropriately reduced quantity of foodstuffs is dispensed.

FIG. 7 shows modifications to the arrangement shown in FIGS. 3 – 6. The dispensing head 36 is formed as an elongate extrusion, from synthetic resin material, and again has a base wall 37 and a pair of upstanding side walls 38, 39. Each of the side walls 38, 39 has formed integrally therewith three inwardly extending parallel flanges 61, 62, 63 and integral with each flange 61 and extending towards the base wall 37 are a pair of flanges 64 defining between them a channel equivalent to the channel 42 of the arrangement described above. In addition, each side wall has formed integrally therewith a longitudinally extending rib 65 of semi-circular cross-section. The ribs 65 define spacers engaging the outer surfaces of the receiver side walls, and the upper edges of the receiver side walls are received between the flanges 64 respectively. The longitudinally extending channels defined between the flanges 61, 62 and 62, 63 can be used to support baffle plates as described above, or alternatively can be used to support a valve arrangement to be described later. The modified end cap assembly 66 shown in FIG. 7 receives a volume control member 67 in the form of a flat rectangular plate having a vertical slot 68 therein. The end cap 66 again includes a pair of parallel flanges 69 which are secured to the side walls of the head, and which are interconnected by an integral base wall 71. The base wall 71 is moulded with a channel therein of T-shaped cross-section, the member 67 being received within the wider part of the channel. A captive bolt 73 extends through the wider part of the channel, and through the slot 68 of the member 67 the projecting portion of the shank of the bolt 73 receiving a wing nut which engages the face of the member 67 to lock the member 67 in any chosen position relative to the wall 71.

FIG. 17 shows a valve arrangement for use with the head construction illustrated in FIG. 7. The valve arrangement 75 comprises a lowermost fixed valve slide 76 which is formed from relatively rigid polyvinyl chloride and which is secured to the surface of the flange 61 presented to the flange 62 in any convenient manner. The slide 76 is in the form of a strip of material having apertures 77, 78 at its ends and a central closed region between the two apertures, the apertures and the closed region each occupying approximately one third of the length of the slide. In addition, there is provided an upper, movable slide 81 formed from aluminium sheet. As with the slide 76 the slide 81 is equal in width to the spacing between the side walls of the head. The slide 81 can be moved manually, lengthwise of the head and is received between the slide 76 and the flange 62. The slide 81 includes, adjacent one end, a closed region 82 an aperture 83 then a second closed region 84 and finally an aperture 85 defining an open ended slot extending longitudinally of the strip. The overall length of the slide 81 is approximately one third greater than the overall length of the slide 76 and each of the regions 82, 83, 84 and 85 occupies approximately one quarter of the length of the slide 81. Thus when the slide 81 is positioned on top of the slide 76 it can be manoeuvred longitudinally to a position wherein the region 82 closes the aperture 77, the region 84 closes the aperture 78, and the region 79 closes the aperture 83. Alternatively the slide 81 can be moved to a position wherein the aperture 83 and 77 are sligned and the apertures 85 and 78 are aligned.

The channel defined between the flanges 62, 63 can support a second, identical valve arrangement, the first valve arrangement being associated with one end of the head, and the second valve arrangement being associated with the opposite end of the head, the hopper and the head being divided internally between the two valve arrangements so that two different foodstuffs can be supplied. In such an arrangement one valve assembly would be in its closed condition while the other valve assembly was in an open condition. The longitudinally extending limbs of the slide, or slides 81 defined by the open ended slot 85 project longitudinally from the opposite longitudinal ends of the head to facilitate manual operation of the valve assemblies.

It will be understood that if desired simple continuous valve plates slidable reative to the head between a position wherein they block the flow of foodstuffs, and a position wherein the flow of foodstuffs is unimpeded could be slidably supported by the flanges 61, 62, 63.

FIG. 14 shows a further alternative form of volume control member. The volume control member 87 shown in FIG. 14 is a synthetic resin moulding, and includes a plate like portion 88 which is slidably received by either of the end cap assembly body portions described above, and which contains an elongate slot 89 through which extends the captive bolt of the locking arrangement. The portion of the member 87 which projects downwardly into the foodstuffs receiver in use is so arranged that it does not extend vertically into the receiver, at right angles thereto, but extends obliquely into the receiver, the member including an inclined portion 91 which extends outwardly from the end of the dispensing head in use so that it trails behind the head as the head moves along the length of the receiver. It has been found with the plane plate arrangement shown in FIG. 7, that in some circumstances jamming can occur when the lower edge of the plate just clears the tops of the partition walls of the receiver. The jamming is thought to occur as a result of the pressure of foodstuffs in the hopper, and the relative movement between the receiver and the plate as the head traverses the length of the receiver, causing the foodstuffs to become packed tightly between the inner face of the plate and the partition walls. This tight packing can occur with certain foodstuffs even though the plate is set to clear the tops of the partition walls without touching them. This problem although not in most cases serious, can nevertheless be minimized by the use of the member 87, or the member 49 in preference to the plane plate 67.

Referring now to FIGS. 8 to 11 the construction of the receiver 31 is as follows. Each partition wall 35 is moulded in a synthetic resin material and has an enlargement 35a adjacent each end thereof, the enlargements 35a defining end surfaces of the partition walls from which project respective integral spigots 35b. The elongate side walls of the receiver 31 are in the form of plane strips provided at predetermined points along their length with apertures of shapes similar to the cross-sectional shape of the spigots 35b in order to construct the receiver a pair of side walls 33, 34 are positioned parallel, and adjacent, one another and partition walls are positioned between them, the spigot 35b at one end of each partition wall extending through an aperture in the side wall 33, and the opposite spigot of each partition wall projecting through the corresponding aperture of the side wall 34. The end faces of the enlargements 35a limit insertion of the spigots 35b through the apertures in the side walls, and the axial length of the spigots are greater than the thickness of the side walls so that the end regions of the spigots project from the exterior surfaces of the side walls. In order to hold the side walls and partition walls in position the projecting portions of the spigots of the partition walls are subject to localized heat and pressure to deform them to produce a head, and simultaneously to weld them to the side walls. Thus the heads produced by deforming the projecting portions of the spigots, and the welds produced simultaneously, secured each partition wall to its associated side walls. The localized heating and pressure can be achieved with readily available, and well known portable tools.

FIGS. 12 and 13 show alternative arrangements where the partition walls are engaged as a snap-fit with their respective side walls. In FIG. 12 the partition wall 135 has enlargements 135a from which extend barbed, resilient limbs 135b. The limbs 135b are received in respective apertures in the side walls, and are flexed towards one another during their insertion through the apertures of the side walls so that when their barbs clear the outer surfaces of the side walls the inherent resilience of the limbs restores the limbs to their original positions so that the barbs engage the outer surfaces of the side walls and so resist dislocation of the side walls from the partition wall. In the arrangement shown in FIG. 13 the partition wall 235 has a cylindrical extension 235b formed with a domed head. Each side wall has a respective circular aperture of diameter equal to the diameter of the cylindrical extension 235b, and the extensions are formed through their respective apertures, the domed heads of the extension being deformed during passage through the side wall apertures and then restoring to their original shape to engage the outer surfaces of the side walls. It is to be understood that either of the snap-fit receiver constructions could be utilized with the dispensing head arrangements described above.

In some instances it is desirable for two different types of foodstuffs to be dispensed by the same apparatus in alternate runs of the apparatus along the length of the trough. FIG. 15 illustrates a modification to the apparatus to facilitate dispensing two different foodstuffs at differentt times. The hopper 20 is divided internally by a partition member 93 to define a pair of hopper portions capable of receiving different foodstuffs. Each of the hopper portions is open at its lower end, and so communicates with the dispensing head, and in use valve means, for example of the form shown in FIG. 17, and described above, will br provided at the open end of each hopper portion so that the flow of foodstuffs from the hopper portion into the head can be controlled.

The partition member 93 abuts the front and rear walls of the hopper 20 and is of inverted V-shape so that each hopper portion tapers both from side to side, and also from front to rear by virtue of the basic shape of the hopper 20, from a maximum dimension at the open, upper end to a minimum dimension at the lower end thereof. The member 93 can be formed from sheet metal, or synthetic resin material, and can be secured to the hopper 20 in any convenient manner, for example by screws or rivets. In order that the food shall flow freely from the hopper portions the partition member 93 presents smooth surfaces to the foodstuffs, and for this reason it may be preferable to produce the member 93 from synthetic resin material.

In order to further aid the flow of foodstuffs within the hopper portions each of the major walls of the member 93 has secured thereto a relatively rigid strip 94, the strips 94 extending downwardly from the member 93 and into the dispensing head in use in such a position that their free ends engage the tops of the partition walls 35 of the receiver 31 as the hopper moves relative to the receiver. It will be understood that the strips 94 are sufficiently flexible to ride over the tops of the partition walls 35 during relative movement between the hopper and the receiver, and during such relative movement the strips will be deflected. Thus as each strip clears a partition wall then the strip will be caused to vibrate as its returns to its rest position and this vibration will be transmitted to the member 94 to aid the flow of foodstuffs within the hopper portions. It is to be understood that if the strips 94 are to be used in an arrangement embodying the baffle plates 51, 52, then the baffle plates must be modified to permit the passage therethrough of the strips 94.

As an alternative to providing a sliding valve plate arrangement within the head, the hopper 20 can be modified to incorporate a valve arrangement. A simple valve arrangement is shown in FIG. 4 where a plate 20a is supported in transversely extending guides secured to the hopper 20, the plate 20a being slidable between the position shown wherein free flow of foodstuffs from the hopper can occur, to a position wherein the plate 20a completely cuts off the flow of foodstuffs from the hopper.

FIG. 16 shows an alternative arrangement which is particularly intended for use in undivided hoppers. Slidably mounted on an inclined rear wall of the hopper 20 is a valve plate 95 which is formed from sheet metal, or synthetic resin material. Throughout the majority of its length the valve plate 95 lies in facial contact with the inner surface of the rear wall of the hopper, but adjacent the open, lower end of the hopper the valve plate 95 is curved upwardly away from the rear wall. The valve plate 95 is slidable between a position shown in solid lines in FIG. 16 wherein it closes the lower end of the hopper and a second position illustrated in broken lines wherein food can flow passed the lower end of the plate 95 and into the head 36. Adjacent its upper free edge the plate 95 is provided with a plurality of screws 96 which extend through respective elongate slots 97 in the hopper wall, the projecting regions of the shanks of the screws 96 receiving nuts 98 conveniently wing nuts whereby the plate 95 can be locked in position relative to the rear wall of the hopper. It will be understood that normally the plate 95 will be locked in either its first position, or its second position, although in some cases it may be desirable to lock the plate in an intermediate position where it restricts, but does not prevent the flow of foodstuffs. In order to prevent loss of foodstuffs from the hopper by way of the slots 97, and to prevent foodstuffs entering between the hopper wall of the plate 95 there is provided a mask 99 in the form of a thin sheet of metal or synthetic resin material having a smooth outer surface. The mask 99 is secured to the upper free edge of the rear wall of the hopper and extends across the full width of the plate 95. The mask extends over the plate 95 to a point below the position which the upper free edge of the plate 95 occupies in its first position. Thus throughout the range of movement of the plate 95 the uppermost edge thereof lies between the mask and the rear wall of the hopper. If desired the screws 96 can be provided at their projecting ends with handles to facilitate movement of the plate 95. The lateral edges of the plate 95 and the mask 99 are received in moulded synthetic resin runners secured to the side walls of the hopper. The runners serve the dual function of guiding the movement of the plate 95 and preventing foodstuffs passing between the side walls of the hopper and the side edges of the plate 95 to enter beneath the plate 95. As stated above, the arrangement described with reference to FIG. 16 is intended particularly for use in an undivided hopper. However, it will be understood that a similar arrangement could be utilized with a divided hopper, and for example if the hopper was provided with a partition wall member 93 as shown in FIG. 15 then the valve plates 95 would be in two separately movable parts so shaped that when in their first position, closing the outlet of their respective hopper portion, they would abut the member 93. It will be understood that the shaping of each valve plate would be such that in a retracted position there would be a gap between the edge of the valve plate and the member 93, and in order to prevent food being jammed between the edge of the valve plate and the member 93 it would be necessary to extend the mask 99 in the region of the member 93 so that the gap would at all times be covered by the mask.

It will be understood that if desired, in any of the arrangements described above the head could, in part, or in total be constructed from sheet metal as could the receiver. However, it is preferred wherever practical, to produce the parts from synthetic resin material since synthetic resin material is more easily fabricated, and less susceptible to corrosion in use.

The forms of receiver described above lie within the feeding trough and are movable laterally by the chickens as permitted by the flexibility of the receiver. Thus the chickens can readily obtain access to all food delivered into the trough whether it be that within the confines of the receiver or that which spills from the receiver as the receiver passes through the head. The receiver however prevents foodstuffs being widely distributed both laterally and longitudinally of the trough by the feeding action of the chickens.

I claim:

1. Apparatus for dispensing animal foodstuffs comprising a foodstuffs receiver of elongate form for stationary positioning in a trough, equal in length to the length of said trough into which foodstuffs are to be dispensed, and, a dispensing head having an outlet coupled to the foodstuffs supply and movably engaged with the receiver for movement in the trough along the length of the receiver, the elongate receiver including elongate parallel side walls interconnected by transversely extending longitudinally spaced partition walls, and the receiver passing through the head below a foodstuffs outlet whereby foodstuffs can pass from the supply through the head and into that portion of the receiver within the head, the outlet being partially obstructed by a baffle means secured with the head and which extend transversely and downwardly towards the receiver, the baffle means directing the flow of foodstuffs into the receiver.

2. Apparatus as claimed in claim 1 wherein the partition walls are of a height less than the height of the side walls.

3. Apparatus as claimed in claim 2 wherein the end of the dispensing head which is the trailing end in use, includes a volume control member the position of which, relative to the receiver, is adjustable in directions towards and away from the partition walls, the volume control member being so shaped as to be able to extend between the side walls of the receiver, and the spacing of the volume control member from the partition walls determining the depth of foodstuffs in the receiver, and thus determining the volume of foodstuffs dispensed.

4. Apparatus as claimed in claim 3, wherein the receiver is open at top and bottom and the head includes a base wall which closes the bottom of that portion of the receiver within the head at any given point in the movement of the head along the length of the receiver, the base wall of the head being extended at the trailing end of the head, beyond the volume control member.

5. Apparatus as claimed in claim 3 wherein the volume control member is in the form of a flat plate of width substantially equal to the internal width of the receiver.

6. Apparatus as claimed in claim 3 wherein the volume control member is in the form of a plate having a region of width substantially equal to the width of the receiver, and inclined in the direction of the length of the receiver.

7. Apparatus as claimed in claim 3 wherein the volume control member is in the form of a plate of V-shaped cross-section position with its apical edge extending generally vertically and at right angles to the direction of movement of the receiver, the apical edge being the trailing point of the volume control member.

8. Apparatus as claimed in claim 3 wherein the head includes a volume control member at each end thereof, so that the apparatus can be used to dispense foodstuffs during movement of the head relative to the receiver, along the length of the receiver, in either direction.

9. Apparatus as claimed in claim 1 wherein the partition walls are engaged with the side walls as a snap fit.

10. Apparatus as claimed in claim 1 wherein the partition walls include portions at opposite ends thereof respectively, extending through the side walls respectively, said portion being welded to the side walls.

11. Apparatus as claimed in claim 10 wherein said portions are deformed on the exterior of the side walls to define heads resisting transverse dislocation of the side walls from the partition walls.

12. Apparatus as claimed in claim 1 including a blanking member detachably engaged with the receiver, and serving, when in position along the length of the receiver to reduce the volume of that region of the receiver which receives the blanking member.

13. Apparatus as claimed in claim 1 wherein the receiver is open at top and bottom, and the head includes a base wall which closes the bottom of that portion of the receiver within the head at any given point in the movement of the head along the length of the receiver.

14. Apparatus as claimed in claim wherein the head is provided with valve means for controlling the flow of foodstuffs through the head into the receiver.

15. Apparatus as claimed in claim 1 wherein said baffle means including first and second parts spaced longitudinally of the receiver, the first and second parts extending transversely of the receiver in opposite directions towards the centreline of the receiver, the first part masking one side of the receiver from the supply of foodstuffs, and the second part masking an opposite side region of the receiver from the supply of foodstuffs, whereby, as the head passes along the receiver each part of the receiver initially receives foodstuffs in that region not masked by the first baffle part, and thereafter receives foodstuffs only in that region not masked by the second baffle part.

16. Apparatus as claimed in claim 15 wherein the head includes first and second outlet apertures by way of each of which foodstuffs can flow into the receiver, each of said outlet apertures having associated therewith first and second baffle means as specified in claim 16.

17. Apparatus as claimed in claim 1 wherein the head had first and second outlet apertures by way of each which foodstuffs can flow into the receiver each of said outlet apertures having associated therewith valve means for controlling the flow of foodstuffs therethrough.

18. Apparatus as claimed in claim 1 in combination with a hopper for containing foodstuffs, the hopper communicating with the outlet aperture of the head so that foodstuffs can flow from the hopper through the outlet aperture and into the receiver within the head.

19. Apparatus as claimed in claim 18 wherein the hopper is divided internally into first and second compartments, and each compartment communicates with the interior of the head by way of a respective outlet aperture in the head.

20. Apparatus as claimed in claim 19 wherein each outlet aperture has associated therewith valve means for controlling flow of foodstuffs through the aperture.

21. Apparatus as claimed in claim 19 wherein the member dividing the hopper into first and second compartments carries an element which extends towards the receiver, and which abuts the partition walls of the receiver during relative movement of the head and receiver, the elements being vibrated by abutment with the partition walls during such relative movement, and the vibration being transmitted by the element to the hopper dividing member so as to aid the flow of foodstuffs from the hopper compartments.

22. Apparatus as claimed in claim 1, wherein the end of the dispensing head which is the trailing end in use includes a volume control member the position of which is adjustable towards and away from the receiver, the spacing of the volume control member from the tops of the partition walls of the receiver determining the depth of foodstuffs carried by the receiver from the head.

* * * * *